United States Patent Office 2,778,839
Patented Jan. 22, 1957

2,778,839

GREEN SUBSTANTIVE DYESTUFFS OF THE ANTHRAQUINONE SERIES

Albin Peter, Binningen, and Wolfgang Frey, Neuewelt, Switzerland, assignors, by mesne assignments, to Saul & Co., Newark, N. J., as nominee of Fidelity Union Trust Company No Drawing. Application November 2, 1953, Serial No. 389,877

Claims priority, application Switzerland November 7, 1952

6 Claims. (Cl. 260—368)

The present invention relates to new green substantive dyestuffs of the anthraquinone series and their process of preparation.

A primary object of the invention is the embodiment of green substantive dyestuffs of the anthraquinone series which are of especial utility in the dyeing of cotton and fibers from regenerated cellulose. This object is realized by the dyestuffs according to the invention, which correpond to the formula

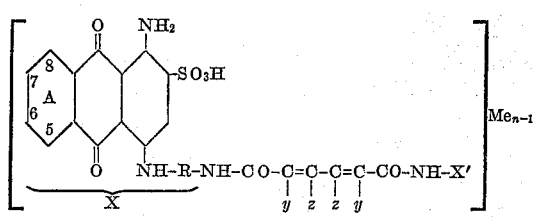

wherein R stands for a phenyl or diphenyl radical which may be substituted by lower alkyl, lower alkoxy or halogen, wherein the nucleus A may bear a sulfonic acid group in one of the positions 5, 6, 7 or 8, or one halogen atom in one of the positions 6 or 7, or two halogen atoms in the positions 6 and 7, and wherein X' stands for the same or a different residue X or for the residue of a yellow azo dyestuff containing one to two azo groups, $y$ stands for hydrogen or chlorine, one $z$ stands for hydrogen or methyl and the other $z$ stands for hydrogen, Me stands for a copper or a nickel atom, and $n$ is one of the numerals 1 and 2.

These new dyestuffs are obtained by condensing two mols of an anthraquinone compound corresponding to the formula

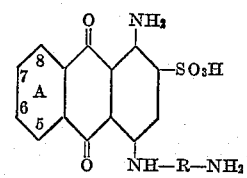

(1)

wherein R has the previously-recited significance, and wherein nucleus A may bear a sulfonic acid group in one of the positions 5, 6, 7 or 8 or a halogen atom or atoms in the 6- and/or 7-positions, or two mols of a mixture in any desired proportions of two or more different anthraquinone compounds, each of which corresponds to Formula 1, or two mols of a mixture in any desired proportions of one or more such anthraquinone compounds and one or more yellow aminoazo compounds, which may be metallized, the condensation being carried out preferably in aqueous solution and in the presence of an acid-binding agent, with one mol of a butadiene-1,4-dicarboxylic acid halide or a derivative thereof substituted by methyl or halogen and then if desired treating the resultant dyestuff with a metal-yielding agent.

Alternatively, one mol of butadiene-1,4-dicarboxylic acid halide is condensed—instead of with two mols of a mixture of one or more anthraquinone compounds and one or more yellow aminoazo compounds, which may be metallized—with two mols of a mixture of one or more anthraquinone compounds (1) and one or more amino compounds containing a substituent which is convertible into a diazotizable amino group or containing a carbon atom which is capable of coupling and, if desired, an azo group, then after converting into an amino group the substituent which is convertible into a diazotizable amino group, diazotizing the condensation product and coupling the resultant diazo compound with an azo component or combining the condensation product with a diazo compound, and finally, if desired, treating the resultant dyestuff with a metal-yielding agent.

Suitable anthraquinone compounds comprise, for example the condensation products from 1-amino-4-bromoanthraquinone-2-sulfonic acid, 1-amino-4-bromoanthraquinone-2,5-disulfonic acid, 1-amino-4-bromoanthraquinone-2,6-disulfonic acid, 1-amino-4-bromoanthraquinone-2,7-disulfonic acid, 1-amino-4-bromoanthraquinone-2,8-disulfonic acid, 1 - amino - 4,6 - dibromoanthraquinone-2 - sulfonic acid, 1 - amino - 4 - bromo - 7 - fluoroanthraquinone - 2 - sulfonic acid, 1 - amino - 4 - bromo - 7 - chloroanthraquinone - 2 - sulfonic acid, 1 - amino - 4,7-dibromoanthraquinone-2-sulfonic acid, and 1-amino-4-bromo - 6,7 - dichloro- or -dibromoanthraquinone - 2 sulfonic acid with 1,4-diaminobenzene, 1,4-diamino-2-chlorobenzene, 1,4 - diamino - 2 - methylbenzene, 1,4 - diamino - 2 - ethylbenzene, 1,4 - diamino - 2 - methoxybenzene, 1,4 - diamino - 2 - ethoxybenzene, 4,4'-diamino-1,1'-diphenyl and 4,4'-diamino-3,3'-dimethyl or -dimethoxy-1,1'-diphenyl, etc. Where a single one of these starting materials is selected, there is obtained a unitary dyestuff corresponding to the formula

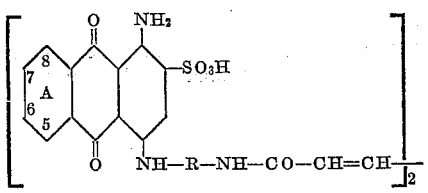

(2)

wherein R has the previously-indicated significance, and wherein the butadiene-1,4-dicarboxylic acid radical may be substituted by methyl or halogen and the nuclei A may bear the hereinbefore-enumerated substituents.

If use is made of different anthraquinone compounds, the molecular proportions thereof are immaterial. Two different starting materials in the molecular proportion of 1:1 generally yield three end products, namely two symmetrical and one unsymmetrical, which contains both starting materials.

The proportions of the three dyestuffs in the final product varies when the starting materials are not employed in the 1:1 molecular proportion, or when more than two starting materials are employed. By suitably selecting the starting materials and the molecular proportions in which they are employed, the final products may be endowed with optimum properties as regards solubility in water, solubility in the dyebath, fastness to washing and fastness to perspiration. The optimum properties for any given starting materials can be readily ascertained by a series of tests with systematically changed molecular proportions. It has been found that the dyestuff mixtures obtained from a mixture of starting materials are, as a rule, better than mixtures of unitary end products.

Yellow aminoazo compounds, which can be used in admixture with the anthraquinone compounds for condensation according to the present invention with the butadiene-1,4-dicarboxylic acid halide comprise, for example, those of the benzene series such as 4-amino-1,1'-azobenzene-4'-sulfonic acid or 4-amino-2',3-dimethyl-1,1'-azobenzene-4'-sulfonic acid, as well as more complicated yellow aminoazo dyestuffs of the stilbene, naphthalene, pyrazolone and acetoacetylaminoaryl series. The addition of aminoazo compounds to the anthraquinone starting compounds, shifts the shade of the final dyestuffs toward yellow-green. The yellow aminoazo compounds combine, at least in part, with the anthraquinone compounds to form mixed dicarboxylic acid amides. Where the aminoazo compounds contain groups which are capable of forming metal complexes, the final products can be converted into metal complex compounds in substance or on the fiber by treating with metal-yielding agents, the resultant metal complex compounds generally having improved fastness toward wet treatments as compared with the non-metallized dyestuffs. It is also possible to use already-metallized animoazo compounds for the condensation with the anthraquinone compounds.

In order to carry out the process, the starting materials, e. g. in the form of their alkali salts, are dissolved in water, after which the butadiene-1,4-dicarboxylic acid halide—which may be dissolved in a solvent such as carbon tetrachloride, chloroform, methylbenzene, chlorobenzene or 1,2-dichlorobenzene—is added to the solution, preferably at temperatures between —10° C. and 30° C., with stirring and at such a slow rate that the hydrogen ion concentration can be retained preferably in the pH range of 6 to 8. The quantity of alkali, necessary to effect this regulation, can be run in, for example, in the form of an aqueous solution of sodium acetate, lithium carbonate, sodium carbonate, sodium borate, sodium hydroxide, etc. However, the liberated acid can also be bound by means of a buffer, e. g. sodium bicarbonate. The obtained dyestuff is precipitated from the solution by salting out or by the addition of acid, if necessary at elevated temperature and after preliminary distillation of the organic solvent. The precipitated dyestuff is separated by filtration and dried, if desired, after conversion thereof into an alkali salt. The thus-obtained dyestuffs are dark green powders which dissolve in water to yield solutions with blue-green, green to yellow-green coloration. From these solutions, the dyestuffs dye fibers and articles of natural and regenerated cellulose in the corresponding shades of excellent fastness to light and generally of very good fastness to washing. The above-described dyestuff mixtures behave in each case, with or without azo components, as unitary dyestuffs.

Metallization in substance of those dyestuffs which contain groups capable of metal complex formation is advantageously effected with copper- or nickel-yielding agents. The coppering, for example, can be carried out by heating the dyestuff with copper salt in weakly acid to weakly alkaline aqueous medium, if desired, with superatmospheric pressure or in the presence of ammonia or organic bases such as diethanolamine, pyridine and guanidine or in a melt of alkali salt of a low molecular aliphatic monocarboxylic acid. If, as substituent which is capable of metal complex formation, the dyestuff contains an alkoxy group, then the metallization advantageously takes place with splitting of such alkoxy group.

Substantially all the dyeings obtained with metallizable and metallized dyestuffs can be treated with cation-active copper complex compounds, which may be basic (such as are obtainable according to Swiss Patents Nos. 253,709 and 261,048–052) whereby their fastness to washing and to perspiration is further improved.

The following examples illustrate the invention without restricting it. In these examples, the parts, unless otherwise indicated are parts by weight; where parts by volume are used this is expressly stated. The percentages are percentages by weight and temperatures are in degrees centigrade. The intermediate products of the anthraquinone series, which are employed, are summarized in the following Table 1; the intermediates are identified by the corresponding Roman numerals.

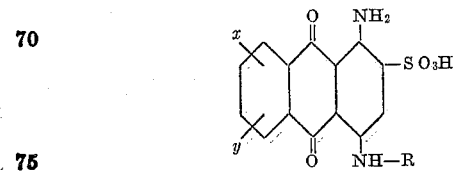

(3)

TABLE 1

| No. | Significance of R | Significance of— x | Significance of— y | Position of— x | Position of— y |
|---|---|---|---|---|---|
| (I) | –C₆H₄–NH₂ | –SO₃H | | 6 | |
| (II) | –C₆H₄–NH₂ | –SO₃H | | 7 | |
| (III) | –C₆H₄–C₆H₄–NH₂ | –SO₃H | | 7 | |
| (IV) | –C₆H₄–NH₂ | –SO₃H | | 5 | |
| (V) | –C₆H₄–NH₂ | | | | |
| (VI) | –C₆H₄(OCH₃)–NH₂ | | | | |
| (VII) | –C₆H₄(OCH₃)–NH₂ | –SO₃H | | 6 | |
| (VIII) | –C₆H₄–NH₂ | –Cl | –Cl | 6 | 7 |
| (IX) | –C₆H₄(Cl)–NH₂ | | | | |
| (X) | –C₆H₃(CH₃)–C₆H₃(CH₃)–NH₂ | –SO₃H | | 7 | |
| (XI) | –C₆H₄–NH₂ | –SO₃H | | 8 | |
| (XII) | –C₆H₄(CH₃)–NH₂ | –SO₃H | | 6 | |

Example 1

19.6 parts of (I) are dissolved in 600 parts of water with the addition of 7 parts of aqueous sodium hydroxide solution of 29% strength. After cooling the solution to 0–5°, it is adjusted to a pH value of 6 to 8.5 and, while stirring thoroughly, a solution of 3.95 parts of butadiene-1,4-dicarboxylic acid chloride in 80 parts of carbon tetrachloride, is added dropwise. By the simultaneous dropwise addition of a dilute sodium hydroxide solution, the pH value is constantly maintained within the above indicated limits. Upon conclusion of the condensation, the carbon tetrachloride is distilled off. The solution is then made strongly acid with the aid of hydrochloric acid and the precipitated dyestuff acid is filtered off with suction. The dyestuff acid is then triturated with sodium carbonate until a neutral reaction is obtained, after which it is dried.

There is thus obtained a blackish green powder which corresponds to the formula

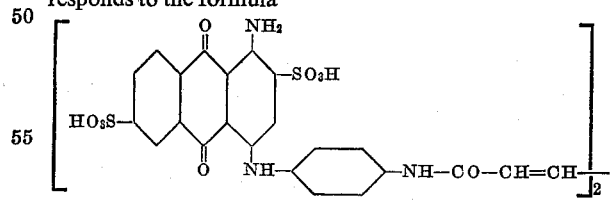

and which dissolves easily in water. From this solution, it dyes cotton and fibers of regenerated cellulose in a pretty green shade of high fastness to light.

Example 2

By repeating the procedure described in Example 1, while replacing the 3.95 parts of butadiene-1,4-dicarboxylic acid chloride by 4.3 parts of 2-methylbutadiene-1,4-dicarboxylic acid chloride, a green dyestuff of similar properties is obtained. It corresponds to the formula

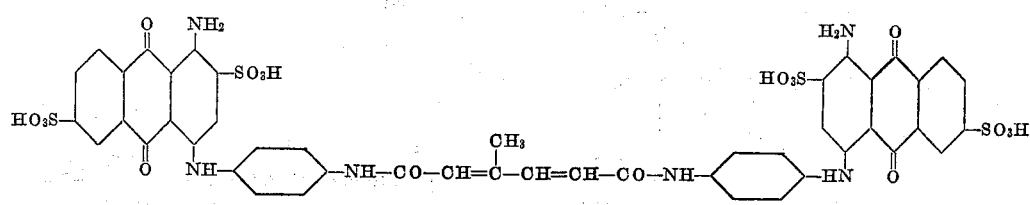

Example 3

Into 600 parts of water, there are stirred 5.5 parts of an aqueous sodium hydroxide solution of 29% strength, 8.2 parts of (V), 10 parts of (I) and 30 parts of chlorobenzene. After adjustment to a temperature of 0–5° and to a pH value of 6.5 to 8.5, a total of 3.9 parts of butadiene-1,4-dicarboxylic acid chloride is added to the mass within a period of 30 minutes, and the liberated HCl is neutralized with dilute aqueous sodium hydroxide solution. Upon conclusion of the condensation the chlorobenzene is distilled off, the solution rendered strongly acid with hydrochloric acid, and the precipitated dyestuff acid is filtered off at 65° with suction. The dyestuff acid is converted into the sodium salt and then dried. The dyestuff is a dark green powder. It is a mixture of three dyestuffs which correspond to the formulae

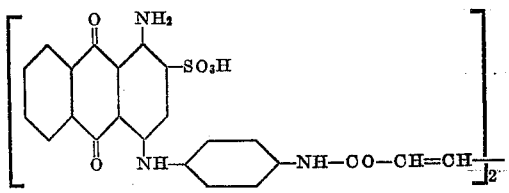

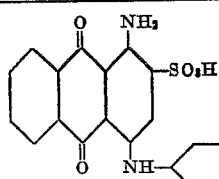

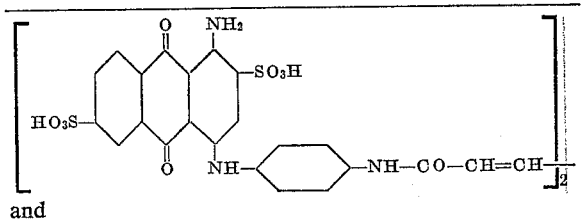

and

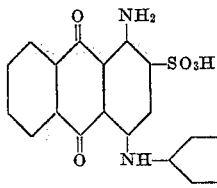

From aqueous solution, the powder dyes cotton and fibers of regenerated cellulose in pretty bluish green shades of very good fastness properties, and particularly good fastness to light.

Example 4

9.8 parts of (V) and 4.5 parts of 4-amino-1,1'-azobenzene-4'-sulfonic acid are dissolved in 600 parts of water with the addition of 5 parts by volume of aqueous sodium hydroxide solution of 30% strength. The resultant solution is cooled to 3–8° and adjusted to a pH value of 6.8 to 8.5, whereupon, in the course of 30 minutes and while stirring thoroughly, there is added dropwise a solution of 3.9 parts of butadiene-1,4-dicarboxylic acid chloride in 75 parts of trichloroethylene, the liberated HCl being neutralized by means of aqueous sodium hydroxide solution. Upon completion of the condensation, the trichloroethylene is distilled off, 40 parts by volume of 30% hydrochloric acid are added to the solution at 75°, and the precipitated dyestuff acid is separated by suction filtration. After pasting with the quantity of sodium carbonate necessary for neutralization and after drying, there is obtained a dark green powder which dyes cotton and fibers of regenerated cellulose from aqueous solution in pure green shades of very good fastness to washing and to light. It is a mixture of three dyestuffs which correspond to the formulae

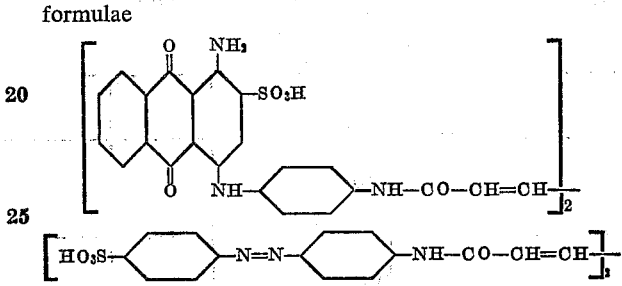

and

Example 5

By repeating the prescriptions of Example 4, but replacing the 3.9 parts of butadiene-1,4-dicarboxylic acid chloride by 5.4 parts of 1,4-dichlorobutadiene-1,4-dicarboxylic acid chloride, a similar dyestuff is obtained. It is a mixture of three dyestuffs which correspond to the

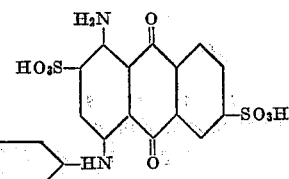

formulae

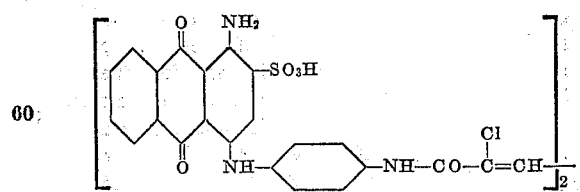

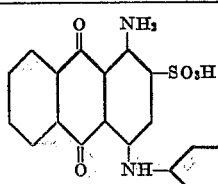

Example 6

In 600 parts of water to which there have been added 4 parts by volume of aqueous sodium hydroxide solution of 30% strength, there are dissolved 10 parts of (V) and 10.8 parts of the trisodium salt of the aminomonoazo compound obtained by coupling diazotized 1-carboxy-2-aminobenzene-5-sulfonic acid with 1-[4''-amino-1',1''-stilbenyl-(4')]-3-methyl-5-pyrazolone-2',2''-disulfonic acid. At a temperature of 0–5° and a pH value between 6.5 and 8.5, there is slowly dropped into the solution, while stirring vigorously, a solution of 3.9 parts of butadiene-1,4-dicarboxylic acid chloride in chloroform, the pH being maintained at the initial value with the aid of dilute aqueous sodium hydroxide solution. Upon completion of the condensation, the mass is adjusted to weak alkalinity and the chloroform is distilled off.

In order to convert the thus-produced dyestuff into its copper complex compound, 8 parts of crystalline sodium acetate and 28 parts by volume of aqueous copper sulfate solution of 20% strength are added to the solution, which is stirred for 15 minutes at 80°. The copper-containing dyestuff is precipitated by the addition of 60 parts of sodium chloride to the reaction solution, and the precipitated dyestuff is separated by suction filtration and dried. There is obtained a dark green powder which dyes cotton and fibers of regenerated cellulose from aqueous solution in pretty yellowish green shades of very good fastness properties and especially good fastness to light. The powder is a mixture of three dyestuffs which correspond to the formulae

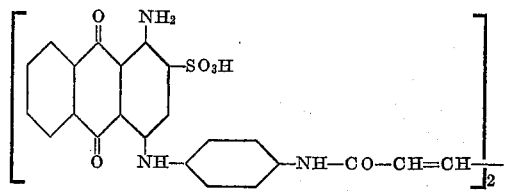

and

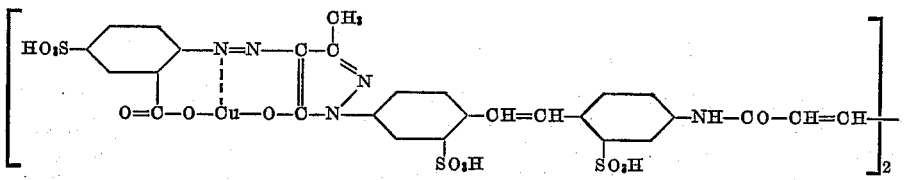

Example 7

The dyestuff of Example 6 is also obtained by dissolving 10 parts of (V) and 7.2 parts of sodium 1-[4''-amino-1',1''-stilbenyl-(4')]-3-methyl-5-pyrazolone-2',2''-disulfonate in 600 parts of water with the addition of 4 parts by volume of 30% aqueous sodium hydroxide solution, and carrying out the condensation with 3.9 parts of butadiene-1,4-dicarboxylic acid chloride in the manner described in the said example. Upon completion of the condensation, the reaction mass is rendered alkaline with sodium carbonate, and cooled to 0–5°, after which there is added an ice-cold diazo suspension obtained by the direct diazotization of 3.2 parts of 1-carboxy-2-aminobenzene-5-sulfonic acid in 12 parts of dilute hydrochloric acid. When the coupling is over, the dyestuff is converted into its copper complex compound in the manner set forth in Example 6.

To prepare the nickel complex compound, 5 parts of the metal-free dyestuff are dissolved in 200 parts of water, and 3 parts of crystalline sodium acetate are added to the solution. There is then added, at 70° and in the course of 20–30 minutes, such a quantity of an aqueous nickel sulfate solution of 10% strength that a permanent excess of nickel (II) ions can be detected. The resultant nickel complex compound of the dyestuff is precipitated from the metallization solution by the addition of sodium chloride; it is then separated by filtration and dried. It possesses properties similar to those of the copper complex compound.

Example 8

Into 600 parts of water there are stirred 4 parts by volume of aqueous sodium hydroxide solution of 30% strength, 4.1 parts of (V), 4.9 parts of (I) and 9.2 parts of the monosodium salt of the aminomonoazo compound obtained by coupling diazotized 1-carboxy-2-aminobenbene-5-sulfonic acid with 1-(4'-amino)-phenyl-3-methyl-5-pyrazolone. The solution is cooled down to 0–5°, after which there is slowly added dropwise, while stirring thoroughly and at a pH of 8, a solution of 3.9 parts of butadiene-1,4-dicarboxylic acid chloride in 60 parts of chloroform. The pH is maintained at the initial value with the aid of dilute aqueous sodium hydroxide solution.

Upon completion of the condensation, the chloroform

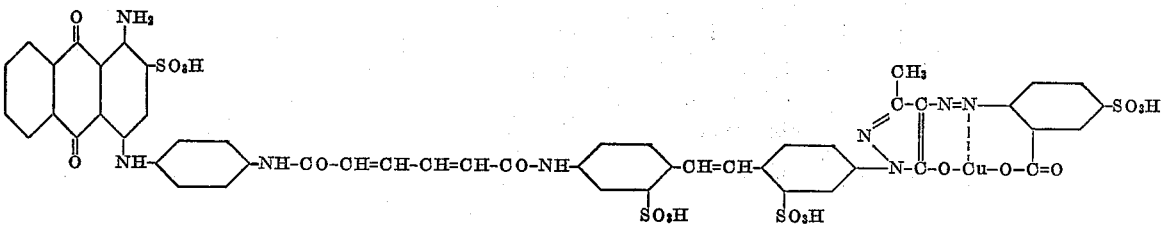

is distilled off, 8 parts of crystalline sodium acetate and 25 parts by volume of aqueous copper sulfate solution of 20% strength added at 80°, and the solution then stirred for an additional 15 minutes at this temperature. The resultant copper complex compound of the dyestuff is precipitated by the addition of sodium chloride and is then filtered off and dried. It is a mixture of several dyestuffs, the asymmetrical ones of which correspond to the formulae

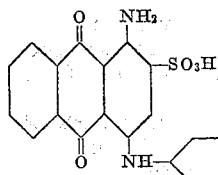 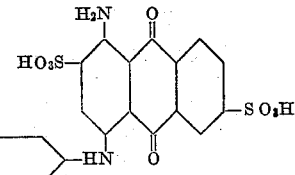

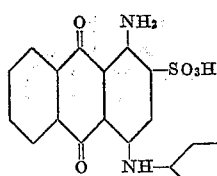 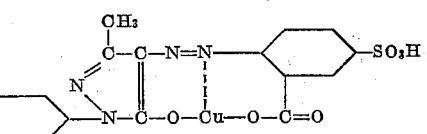

and

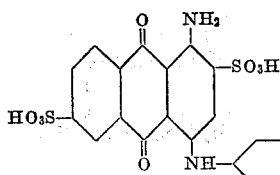 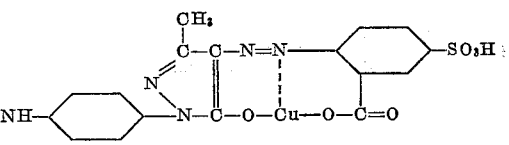

It dyes cotton and fibers of regenerated cellulose from aqueous solution, in yellow-green shades. The dyeings possess very good fastness to wet treatments and to light.

*Example 9*

In 400 parts of water, there are dissolved 5.1 parts of (XII) and 7.4 parts of the trisodium salt of the copper complex of the aminomonoazo compound, obtained by coupling diazotized 1-carboxy-2-aminobenzene-5-sulfonic acid with 1-[4″-amino-1′,1″-stilbenyl-(4′)]-3-methyl-5-pyrazolone-2′,2″-disulfonic acid, together with such quantity of dilute aqueous sodium hydroxide solution that the pH value amounts to 8. Thereupon at a temperature of 0-5°, there is slowly added to the mixture, while stirring vigorously, a solution of 2.7 parts of 1,4-dichlorobutadiene-1,4-dicarboxylic acid chloride in carbon tetrachloride, the pH value being maintained constant with the aid of dilute aqueous sodium hydroxide solution. Upon termination of the condensation, the carbon tetrachloride is distilled off. The copper-containing dyestuff is precipitated from the condensation solution by the addition of 50 parts of sodium chloride, after which the precipitate is separated by suction filtration in the cold and dried. There is thus obtained a green powder which, from aqueous solution, dyes cotton and fibers of regenerated cellulose in yellow-green shades with good fastness properties. It is a mixture of three dyestuffs which correspond to the formulae

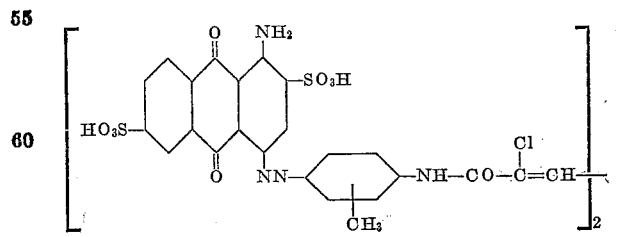

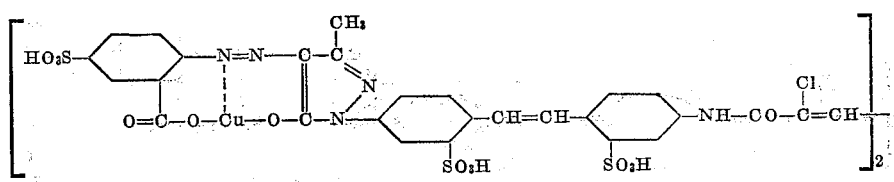

and

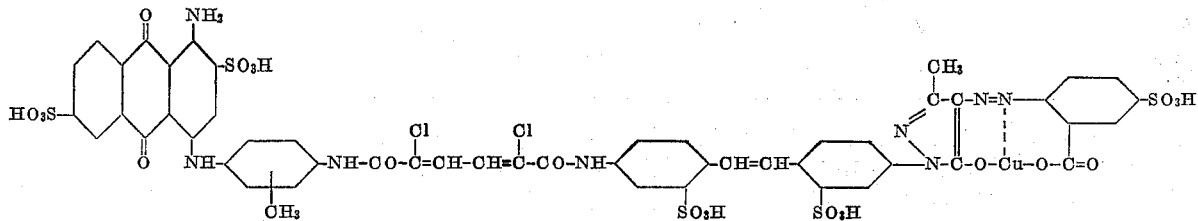

wherein one Z' stands for methyl, the other Z' being hydrogen.

Example 10

4.1 parts of (V) and 4.6 parts of the monosodium salt of the aminomonoazo dyestuff obtained by coupling diazotized 1-carboxy-2-aminobenzene-5-sulfonic acid with 1-(4'-amino)-phenyl-3-methyl-5-pyrazolone are dissolved in 400 parts of water and 7 parts by volume of aqueous sodium hydroxide solution of 10% strength. The mixture is cooled down to 0–10° and at this temperature there is slowly added, dropwise and with good stirring, 2.2 parts of 2-methylbutadiene-1,4-dicarboxylic acid chloride. With the aid of dilute aqueous sodium hydroxide solution, the pH value of the mixture is maintained between 6.5 and 8.5. When the reaction has terminated, the mixture is heated to 80°, 5 parts of crystalline sodium acetate and 20 parts by volume of aqueous copper sulfate solution of 20% strength are added, and the mixture stirred for an additional 15 minutes at 80°. The resultant copper-containing dyestuff is precipitated from the metallization solution at 70° with the aid of 40 parts of sodium chloride after which the dyestuff is isolated by suction filtration. After drying, it is a dark green powder which dyes cotton and fibers of regenerated cellulose, from aqueous solution, in yellowish green shades. The dyeings show very good fastness to light and to washing. The powder is a mixture of three dyestuffs which correspond to the formulae In the following Table 2, further dyestuffs are described which can be prepared by one of the methods set forth in Examples 1 to 10. The dyestuffs are characterized by the listing in column (b) of the components to be bound together by the butadiene-1,4-dicarboxylic acid halide of the formula

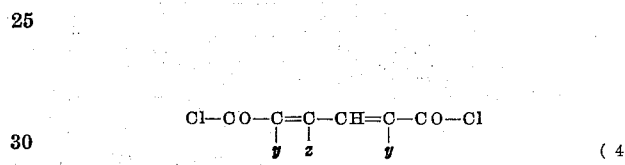

(4)

Column (c) sets forth the number of parts of butadiene-1,4-dicarboxylic acid chloride employed, and columns (d) and (e) set forth the significance of symbols y and z in Formula 4. The shade of the dyeings of the new dyestuffs on cotton and fibers of regenerated cellulose is set forth in column (f).

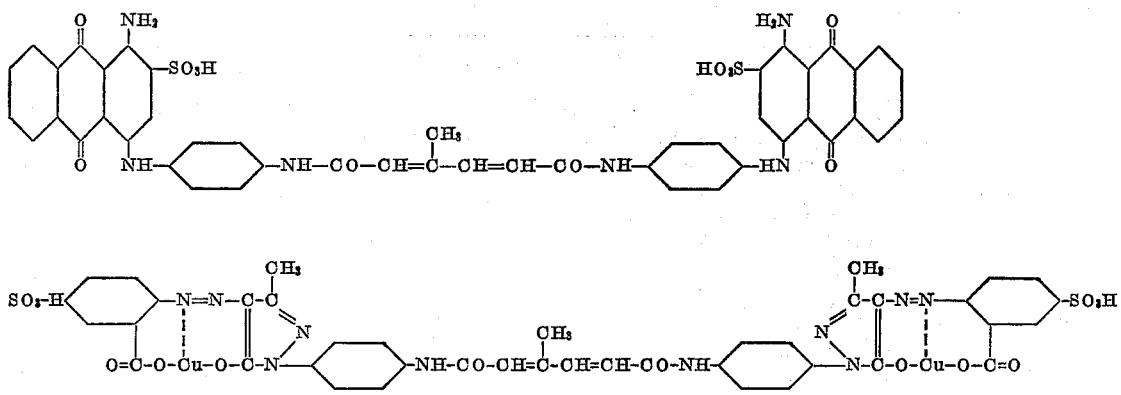

and

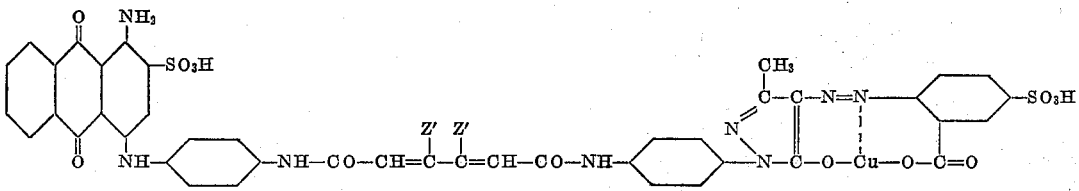

TABLE 2

| (a) Example No. | (b) | (c) | (d) y= | (e) z= | (f) |
|---|---|---|---|---|---|
| 11 | 19.5 parts of (II) | 3.9 | H | H | green. |
| 12 | 22.6 parts of (III) | 3.9 | H | H | bluish green. |
| 13 | 23.8 parts of (X) | 3.9 | H | H | Do. |
| 14 | 22.6 parts of technical mixture of (IV) and (XI) | 3.9 | H | H | Do. |
| 15 | 10 parts of (I), 9.6 parts of (VIII) | 3.9 | H | H | Do. |
| 16 | 9.8 parts of (V), 7.8 parts of technical mixture of (IV) and (XI) | 3.9 | H | H | Do. |
| 17 | 10.6 parts of (IX), 7.8 parts of technical mixture of (IV) and (XI) | 3.9 | H | H | Do. |
| 18 | 11.8 parts of (VI), 7 parts of (VII) | 3.9 | H | H | green. |
| 19 | 7.4 parts of (I), 1.5 parts of (III), 1.1 parts of (V) | 2.4 | H | H | Do. |
| 20 | 9.8 parts of (I), 9.3 parts of monosodium salt of (1-carboxy-2-aminobenzene-5-sulfonic acid $\longrightarrow$ 1-(4'-amino)-phenyl-3-methyl-5-pyrazolone). | 5.3 | Cl | H | yellowish green. |
| 21 | 9.8 parts of (I), 9.3 parts of monosodium salt of (1-carboxy-2-aminobenzene-4-sulfonic acid $\longrightarrow$ 1-(3'-amino)-phenyl-3-methyl-5-pyrazolone). | 5.3 | Cl | H | green. |
| 22 | 9.8 parts of (I), 4.7 parts of monosodium salt of (1-carboxy-2-aminobenzene-4-sulfonic acid $\longrightarrow$ 1-(3'-amino)-phenyl-3-methyl-5-pyrazolone), 4.6 parts of monosodium salt of (1-carboxy-2-aminobenzene-5-sulfonic acid $\longrightarrow$ 1-(4'-amino)-phenyl-3-methyl-5-pyrazolone). | 5.3 | Cl | H | Do. |
| 23 | 10 parts of (I), 8.2 parts of (V) | 4.3 | H | CH$_3$ | bluish green. |
| 24 | 14.7 parts of (I), 4.1 parts of (V) | 4 | H | H | green. |
| 25 | 12.3 parts of (V), 4.9 parts of (I) | 4 | H | H | bluish green. |
| 26 | 4.9 parts of (I), 4.1 parts of (V) | 3 | Cl | H | olive-green. |
| 27 | 9.8 parts of (I), 9.4 parts of monosodium salt of (1-carboxy-2-aminobenzene-5-sulfonic acid $\longrightarrow$ 1-aceto-acetylamino-4-aminobenzene). | 3.9 | H | H | green. |
| 28 | 10.2 parts of (XII), 9 parts of monosodium salt of (1-methoxy-2-amino-5-nitrobenzene $\longrightarrow$ 1-acetoacetylamino-benzene-4-sulfonic acid and reduction). | 3.9 | H | H | Do. |
| 29 | 9.8 parts of (I), 10.3 parts of disodium salt of (2-aminonaphthalene-6, 8-disulfonic acid $\longrightarrow$ 1-amino-3-methylbenzene). | 3.9 | H | H | yellowish green. |
| 30 | 9.8 parts of (I), 11.3 parts of disodium salt of (2-aminonaphthalene-4, 8-disulfonic acid $\longrightarrow$ 1-amino-3-acetylaminobenzene). | 4.3 | H | CH$_3$ | Do. |
| 31 | 5.1 parts of (XII), 7.5 parts of trisodium salt of (1-hydroxy-2-amino-6-chlorobenzene-4-sulfonic acid $\longrightarrow$ 1-[4''-amino-1', 1''-stilbenyl-(4')]-3-methyl-5-pyrazolone-2', 2''-disulfonic acid). | 2.2 | H | CH$_3$ | Do. |
| 32 | 9.8 parts of (I), 4.6 parts of monosodium salt of 4-amino-4'-hydroxy-1, 1'-azobenzene-3'-carboxylic acid. | 4 | H | H | green. |
| 33 | 12.3 parts of (I), 6.0 parts of (4-amino-1, 1'-azobenzene-3, 4'-disulfonic acid $\longrightarrow$ 1-(4'-amino)-benzoylamino-3-methyl-benzene). | 4 | H | H | olive-green. |
| 34 | 10.4 parts of (V), 8.4 parts of (4-amino-1, 1'-azobenzene-3, 4'-disulfonic acid $\longrightarrow$ 1-amino-3-acetylaminobenzene). | 4 | H | H | Do. |
| 35 | 5.1 parts of (XII), 7.3 parts of trisodium salt of (1-methoxy-2-aminobenzene-4-sulfonic acid $\longrightarrow$ 1-[4''-amino-1', 1''-stilbenyl-(4')]-3-methyl-5-pyrazolone-2', 2''-disulfonic acid). | 2 | H | H | yellowish green. |

Example 36

By repeating Example 3 with 9.8 parts of the technical mixture of 1-amino-4-(4'-amino)-phenylamino-6-bromoanthraquinone-2-sulfonic acid and 1-amino-4-(4'-amino)-phenylamino-7-bromoanthraquinone-2-sulfonic acid in place of the 8.2 parts of (V), there is obtained a similar dyestuff of like excellent properties.

Example 37

If, in Example 4, the 9.8 parts of (V) are replaced by 10.3 parts of 1-amino-4-(4'-amino)-phenylamino-6-fluoroanthraquinone-2-sulfonic acid, a dyestuff of similar properties is obtained.

Example 38

1 part of the dyestuff, prepared according to Example 25, is dissolved in 200 parts of distilled water at 100°. The resultant solution is poured into 3000 parts of water, 30 parts of anhydrous sodium sulfate are added to the resultant dyebath, and 100 parts of pre-wetted cotton-satin are entered into the bath at 50–60°. The bath is then heated to 90–95° and maintained at this temperature for 30 minutes. Thereafter it is allowed to boil for 15 more minutes. After cooling the bath down to 75° the dyed material is withdrawn, rinsed and dried. The obtained green dyeing is of good fastness to light and to wet treatments.

Dyeing with metal-containing dyestuffs can also be carried out in this manner.

Example 39

Dyeing is carried out with any one of the hereinbefore-described metallizable dyestuffs, following the process outlined in Example 38. The rinsed dyeing is aftertreated in a bath consisting of 2000 parts of water, 3 parts of crystalline copper sulfate and 3 parts of acetic acid, being treated in the said bath for 20 minutes at 60°. It is then rinsed and dried.

Example 40

A dyeing obtained with a metallizable or metallized dyestuff produced according to the present invention may be aftertreated as follows:

The dyed material, e. g. the material dyed according to Example 38, is moved about for 30 minutes at 60–70° in a bath consisting of 2500 parts of water and 2.5 parts of a copper-containing condensation product built up on the basis of dicyandiamide. The coppered dyeing is then rinsed and dried.

Having thus disclosed the invention what is claimed is:
1. A green substantive dye obtained by condensing a 1- aminoanthraquinone-2-sulfonic acid corresponding to the formula

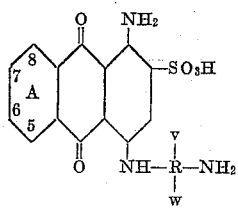

wherein R stands for a member selected from the group consisting of phenyl and diphenyl radicals, $v$ stands for a member selected from the group consisting of hydrogen, lower alkyl, lower alkoxy and halogen, $w$ stands for a member selected from the group consisting of hydrogen and lower alkyl, and wherein the nucleus A is a nucleus selected from the group consisting of the unsubstituted nucleus, a nucleus substituted in one of the positions 5, 6, 7 and 8 by a sulfonic acid group, a nucleus substituted in one of the positions 6 and 7 by a halogen atom and a nucleus substituted in both positions 6 and 7 by halogen atoms, with a member selected from the group consisting of the same 1-aminoanthraquinone-2-sulfonic acid and a 1-aminoanthraquinone-2-sulfonic acid different from the first one but corresponding to the aforesaid formula, by treating them with such a quantity of a dicarboxylic acid halide corresponding to the formula

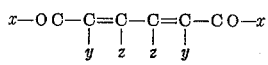

wherein $x$ stands for a member selected from the group consisting of chlorine and bromine, $y$ stands for a member selected from the group consisting of hydrogen and chlorine, one $z$ stands for a member selected from the group consisting of hydrogen and methyl, the other $z$ stands for hydrogen, that there are for each molecule of the dicarboxylic acid halide two molecules of 1-aminoanthraquinone-2-sulfonic acid.

2. The anthraquinone dyestuff which corresponds to the formula

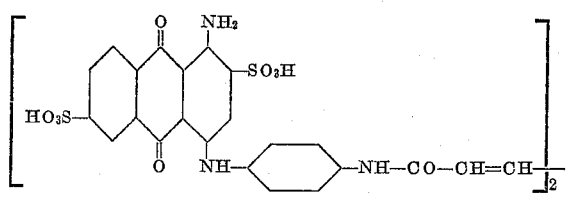

3. The green substantive anthraquinone dye obtained by condensing 1 molecular proportion of the 1-aminoanthraquinone-2-sulfonic acid corresponding to the formula

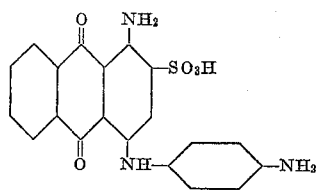

and 1 molecular proportion of the 1-aminoanthraquinone-2-sulfonic acid corresponding to the formula

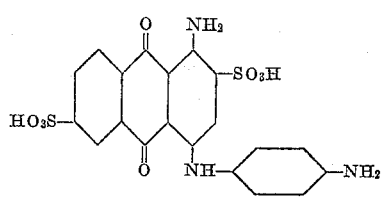

with 1 molecular proportion of butadiene-1,4-dicarboxylic acid chloride.

4. The green substantive dye obtained by condensing 1.5 molecular proportions of the 1-aminoanthraquinone-2-sulfonic acid corresponding to the formula

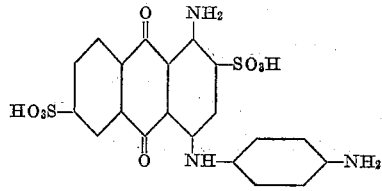

and 0.5 molecular proportion of the 1-aminoanthraquinone-2-sulfonic acid corresponding to the formula

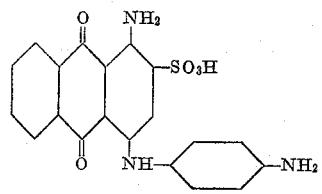

with 1 molecular proportion of butadiene-1,4-dicarboxylic acid chloride.

5. The green substantive anthraquinone dye obtained by condensing 2 molecular proportions of the technical mixture of the 1-aminoanthraquinone-2-sulfonic acids which correspond to the formulae

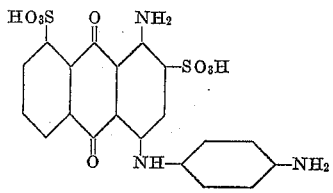

and

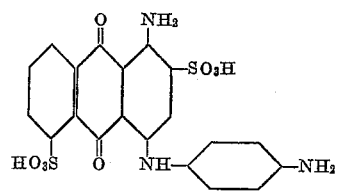

with 1 molecular proportion of butadiene-1,4-dicarboxylic acid chloride.

6. The green substantive dye obtained by condensing 1.2 molecular proportions of the 1-aminoanthraquinone-2-sulfonic acid corresponding to the formula

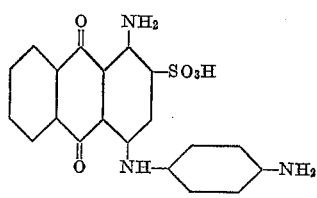

and 0.8 molecular proportion of the technical mixture of the 1-aminoanthraquinone-2-sulfonic acids corresponding to the formulae

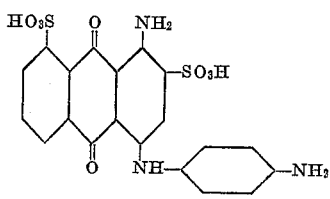

and
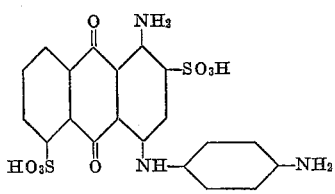
with 1 molecular proportion of butadiene-1,4-dicarboxylic acid chloride.
References Cited in the file of this patent
UNITED STATES PATENTS
| | | |
|---|---|---|
| 2,623,884 | Peter | Dec. 30, 1952 |
| 2,729,629 | Frey et al. | Jan. 3, 1956 |
FOREIGN PATENTS
| | | |
|---|---|---|
| 504,489 | Belgium | July 31, 1951 |